Jan. 16, 1968     R. A. EKSTROM, JR     3,364,078
SURFACE TEMPERATURE THERMOCOUPLE FIXTURE
Filed Sept. 11, 1964
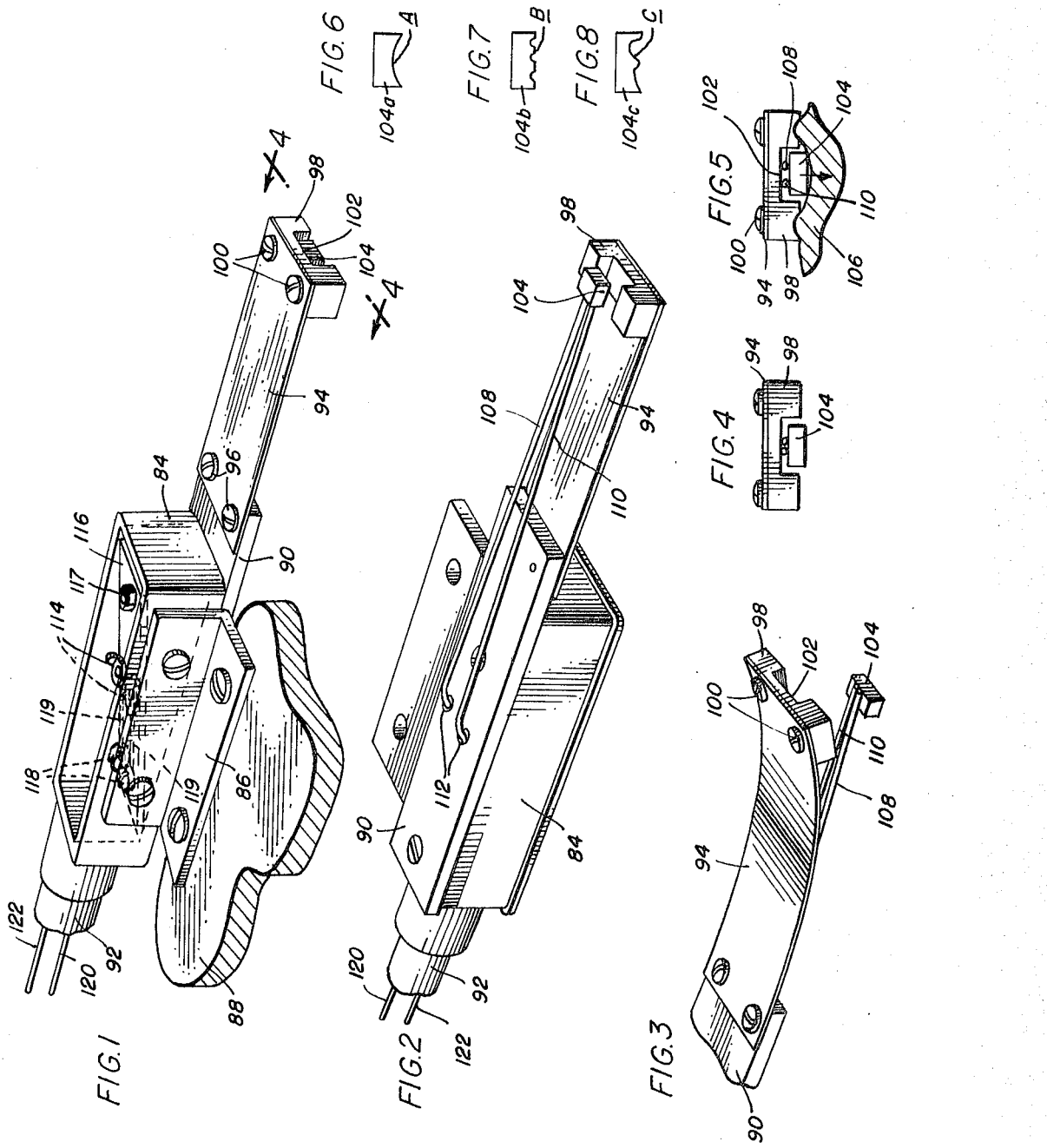
INVENTOR:
REGNER A. EKSTROM, JR.
BY
ATT'Y

United States Patent Office 3,364,078
Patented Jan. 16, 1968

3,364,078
SURFACE TEMPERATURE THERMOCOUPLE FIXTURE
Regner A. Ekstrom, Jr., 15555 Millard Ave., Markham, Ill. 60426
Continuation-in-part of application Ser. No. 202,597, June 14, 1962. This application Sept. 11, 1964, Ser. No. 401,753
1 Claim. (Cl. 136—221)

This invention is a continuation-in-part of my application No. 202,597 filed June 14, 1962, and now Patent No. 3,279,956, and relates generally to the measurement of surface temperatures of metallic and non-metallic materials, employing the well known principles of subjecting different metals subjected to the same heat cause varying electrical potentials which may be noted and calibrated for measurements.

Different bi-metallic pairs are used for observing different temperature ranges for calibration.

An important object of the invention is to subject a wire thermocouple to the surface temperature of an article without coming in destructive contact with the surface itself.

Another object of the invention is to subject a juncture of a wire thermocouple to a rough or smooth surface indirectly, either moving or stationary, in close relation thereto as to receive heat directly therefrom.

Other and further objects of the invention will appear in the specification, and will be apparent from the accompanying drawings, in which:

FIG. 1 is a perspective view of the upper side of a fixture having a flexible support in the form of a refractory insulating member having a bottom recess;

FIG. 2 is a perspective view of the under side of the fixture shown in FIG. 1, having an electrically and thermally conductive block freely mounted in the recess and connected to relatively large thermocouple wires which flexibly support it;

FIG. 3 is a detail perspective view of the flexible support of FIG. 1 curved upwardly at the outer end to disclose the thermocouple wires and their connecting block;

FIG. 4 is an end view of FIG. 1 showing the conductive block in the recess of the insulator;

FIG. 5 is a view similar to FIG. 4 showing the insulator in contoured engagement with a rough material and the conductive block resiliently engaging the material in the recess of the insulator; and FIGS. 6, 7, and 8 show end elevational views of different conductive blocks having contact surfaces of different shapes.

In general, this fixture is relatively movable and applicable to a surface whose temperature is to be measured. Some surfaces require a more compressive application than others; and in all cases, the thermocouple wires are spaced or protected from direct engagement with the surface to be measured, but are in indirect contact therewith so that the conduction of heat from surfaces may be obtained and recorded with the least heat loss, and therefore with the greatest accuracy and efficiency.

Referring now more particularly to the drawings, a supporting conduit or box 84 may have a fixed bracket 86 connecting it to a solid frame 88 with a base 90 of insulating or refractory material at the bottom of the box projecting at one end, with a conduit 92 extending from the other end of the box. From the projecting end of the base 90, a blade 94 of spring material is connected by screws 96 or in any other suitable manner. At the other end of this block, a refractory block 98 is secured by screws 100, or other suitable means, and has a central recess 102 open at the other side thereof.

In this recess is a smaller connector block 104 which preferably is made of metal, such as lead, copper, monel metal, brass, cast iron, or tool steel, while the cradle block 98 is of insulating material. This block 98 is insulating or refractory material, with its projecting ends formed by the center recess 102, rides in contact with a material 106 when moved relatively; the block ends engage the surface of the material 106 like a brush or commutator, which is therefore subject to the wear of such frictional contact.

This connector block 104 is attached to adjacent extremities of thermocouple wires 108 and 110 which are flexible but do not permit rotation of the block 104 and extend therefrom below the spring blade 94 and curve upwardly through openings 112 in the base 90 into the box 84 to respective terminal screws 114 and 118 on an inclined insulator 116 in the box.

The block 104 is resiliently mounted on the wires 108 and 110, but pressure is applied only by the spring blade 104 and its cradle block 98. The heat conducting block 104 is contoured to fit and be pressed against the material surface 106 by the blade 94 for intimate contact.

Centrally in the insulator 116 the terminal screws 114 and 118 are connected on one side to the thermocouple wires 108 and 110. On the other side of the insulator the conductors 114 and 118 are connected to conductor wires 122 and 120, respectively, leading therefrom to a suitable electro-responsive device (not shown) for reading the temperature.

Portions of the outer contact surfaces of the ends of the cradle block 98 may rest directly upon the material 106, and even the connector block 104 may be conductive but the wires do not ordinarily come in contact with the material to be tested, and are spaced therefrom by the block 104, receiving a closely adjacent *radiation and convection* of heat from the material 106. Even if the spring 94 is flexed manually, or by a fixed bracket, as in FIG. 1, the connection of the thermocouple wires 108, 110 will not be manually applied to the material 106 itself.

In this heavier wire construction, the wires 108 and 110 are easily bent or deflected, and may be increased to a No. 14 wire gage size, which is approximately one-sixteenth of an inch in diameter. The terminals are anchored or welded to screws 118 and 114, and thence connected to wires 120 and 122 which afford connections for a desired electro-responsive device.

The metal connector block 104 and the refractory cradle block 98 are intended to withstand wear when used against rough surfaces, or when used to ride on rough surfaces for long periods, say up to five years. It is intended to be mounted permanently on process machinery, and not to be portable or manually applied.

Actual contact blocks 104 may have different shapes or contours for brush engagement with a variety of surfaces; the standard block 104 has a plain brush surface for flat and round surfaces; a brush 104a as shown in FIG. 6 has an inwardly rounded brush surface A to more accurately accommodate pipe, tube and conduit surfaces; another brush 104B as shown in FIG. 7 has a notched brush surface B for more intimate contacts with wires and cables; and FIG. 8 shows a block 104C having a notched contact brush surface C for application to forming wheels, seaters, crimpers, and the like, as required. It is most desirable to have the brush surface of the same or a similar shape as that of the surface whose temperature is to be measured.

The contact temperature is quickly transmitted to the conductor block 104 and the juncture of the thermocouple wires 108, 110, which are not intended to withstand abrasive or mechanical strain and wear. The mass of block 104 is large enough to equalize frictional heat as compared to the smaller area of the thermocouple wires themselves.

I claim:

1. A surface temperature measurement type thermocouple comprising a supporting box with an insulating base at the bottom and a partition member in the box;

(a) a spring blade projecting from one end of said insulating base and extending freely away from the box;

(b) an insulating block secured to the free end of the spring blade and having a recess in its outer side opposite the spring;

(c) a pair of thermocouple wires attached to said partition, projecting freely through the insulating base and extending unsupported parallel to said spring blade, and terminating within said insulating block recess, and (d) a thermal conductor block of a size smaller than the insualting block recess, supported solely by thermocouple wires, connected to wires between the conductor block and the insulating block, and forming a measuring junction with the thermocouple wires, said wires being of such thickness relative to said conductor block as to allow the block to swing freely in the recess but to prevent it from rotation therein.

References Cited

UNITED STATES PATENTS

| | | | |
|---|---|---|---|
| 2,059,480 | 11/1936 | Obermaier | 136—4 |
| 2,103,548 | 12/1937 | Obermaier | 136—4X |
| 2,285,457 | 6/1942 | Obermaier | 73—359 |
| 2,422,124 | 6/1947 | Obermaier | 136—4 |
| 2,694,313 | 11/1954 | Nieman | 136—4X |
| 2,836,640 | 5/1958 | Mueller | 136—4X |
| 3,178,112 | 4/1965 | Rudd | 73—359X |

OTHER REFERENCES

Alnor. Bulletin 3511B., May 1944, pp. 2 and 3.
Bedford et al. In., J. Hygiene, vol. 34, 1934 pp. 81–86.
Bureau of Standards, B.S. 1041: Temperature Measurement, 1943, pp. 55 and 56.

ALLEN B. CURTIS, *Primary Examiner.*

JOHN H. MACK, WINSTON A. DOUGLAS,
*Examiners.*

A. M. BEKELMAN, *Assistant Examiner.*